(12) United States Patent
Gerard et al.

(10) Patent No.: US 10,277,698 B1
(45) Date of Patent: Apr. 30, 2019

(54) REMOTE DISPLAY USING A PROXY

(71) Applicant: MOBILE IRON, INC., Mountain View, CA (US)

(72) Inventors: Gregory Christopher Gerard, Palo Alto, CA (US); Joshua Sirota, Los Altos, CA (US)

(73) Assignee: MOBILE IRON, INC., Mountain View, CA (US)

( * ) Notice: Subject to any disclaimer, the term of this patent is extended or adjusted under 35 U.S.C. 154(b) by 483 days.

(21) Appl. No.: 14/569,525

(22) Filed: Dec. 12, 2014

Related U.S. Application Data

(60) Provisional application No. 61/915,463, filed on Dec. 12, 2013.

(51) Int. Cl.
  *H04L 29/08* (2006.01)
  *H04L 29/06* (2006.01)

(52) U.S. Cl.
  CPC .............. *H04L 67/28* (2013.01); *H04L 67/42* (2013.01)

(58) Field of Classification Search
  CPC ................................ H04L 67/28; H04L 67/42
  See application file for complete search history.

(56) References Cited

U.S. PATENT DOCUMENTS

| | | | |
|---|---|---|---|
| 6,965,924 B1 * | 11/2005 | Gerthe | G06F 17/30197 707/E17.01 |
| 8,819,249 B2 * | 8/2014 | Harrison | H04L 12/189 709/227 |
| 8,849,979 B1 | 9/2014 | Qureshi | |
| 2006/0217111 A1 | 9/2006 | Marolia | |
| 2007/0101407 A1 * | 5/2007 | Cheung | H04L 63/0884 726/4 |
| 2008/0064383 A1 | 3/2008 | Nath | |
| 2009/0080453 A1 * | 3/2009 | Stirbu | H04L 12/2834 370/433 |
| 2013/0094423 A1 * | 4/2013 | Wengrovitz | H04L 12/1836 370/312 |
| 2013/0143522 A1 | 6/2013 | Rege | |
| 2013/0332524 A1 | 12/2013 | Fiala | |
| 2014/0032691 A1 * | 1/2014 | Barton | H04L 41/00 709/206 |
| 2014/0040979 A1 | 2/2014 | Barton | |
| 2014/0086105 A1 * | 3/2014 | Kang | H04L 67/26 370/259 |

(Continued)

*Primary Examiner* — Kevin T Bates
*Assistant Examiner* — Ronak Patel
(74) *Attorney, Agent, or Firm* — Van Pelt, Yi & James LLP

(57) ABSTRACT

Information associated with a remote display server is received at a mobile device from a device management server. A local display node is advertised. A request to connect to the local display node is received from a mobile device component. The component sends the request in response to a command received from the device management server to connect to the local display node. The local display node uses the information associated with the remote display server to advertise the local display node in a manner that associates the local display node with the command received by the component. A connection is established between the local display node and the component in response to the request. The information associated with the remote display server and the connection between the component and the local display node is used to transparently proxy data from the component to the remote display server.

18 Claims, 10 Drawing Sheets

(56) References Cited

U.S. PATENT DOCUMENTS

| | | |
|---|---|---|
| 2014/0154648 A1 | 6/2014 | Gonsalves |
| 2014/0250472 A1* | 9/2014 | Huang ............... H04N 21/4325 |
| | | 725/82 |
| 2014/0254788 A1 | 9/2014 | Annapareddy |
| 2015/0095773 A1 | 4/2015 | Gonsalves |
| 2015/0160634 A1* | 6/2015 | Smith ................ G07C 9/00571 |
| | | 700/90 |
| 2015/0304484 A1* | 10/2015 | Halmstad .......... H04M 1/72577 |
| | | 455/419 |
| 2016/0134996 A1* | 5/2016 | Verma ................ H04W 4/008 |
| | | 709/205 |
| 2016/0364200 A1* | 12/2016 | Beveridge ............. G06F 3/1454 |

* cited by examiner

US 10,277,698 B1

REMOTE DISPLAY USING A PROXY

CROSS REFERENCE TO OTHER APPLICATIONS

This application claims priority to U.S. Provisional Patent Application No. 61/915,463, entitled HELP DESK USING PROXY filed Dec. 12, 2013 which is incorporated herein by reference for all purposes.

BACKGROUND OF THE INVENTION

Wireless data streaming services and/or applications allow a device display to be streamed to another node for display. For example, a wireless data streaming application and/or service may capture the display of a mobile device and stream the display data to a display server. The display server may output the streaming data for display on, for example, a television, a computer display, and/or other type of display. Many wireless data streaming applications are only functional when the mobile device and the display are on the same local network (e.g., virtual local area network (VLAN), local subnet, etc.).

BRIEF DESCRIPTION OF THE DRAWINGS

Various embodiments of the invention are disclosed in the following detailed description and the accompanying drawings.

DETAILED DESCRIPTION

Figure 1A:
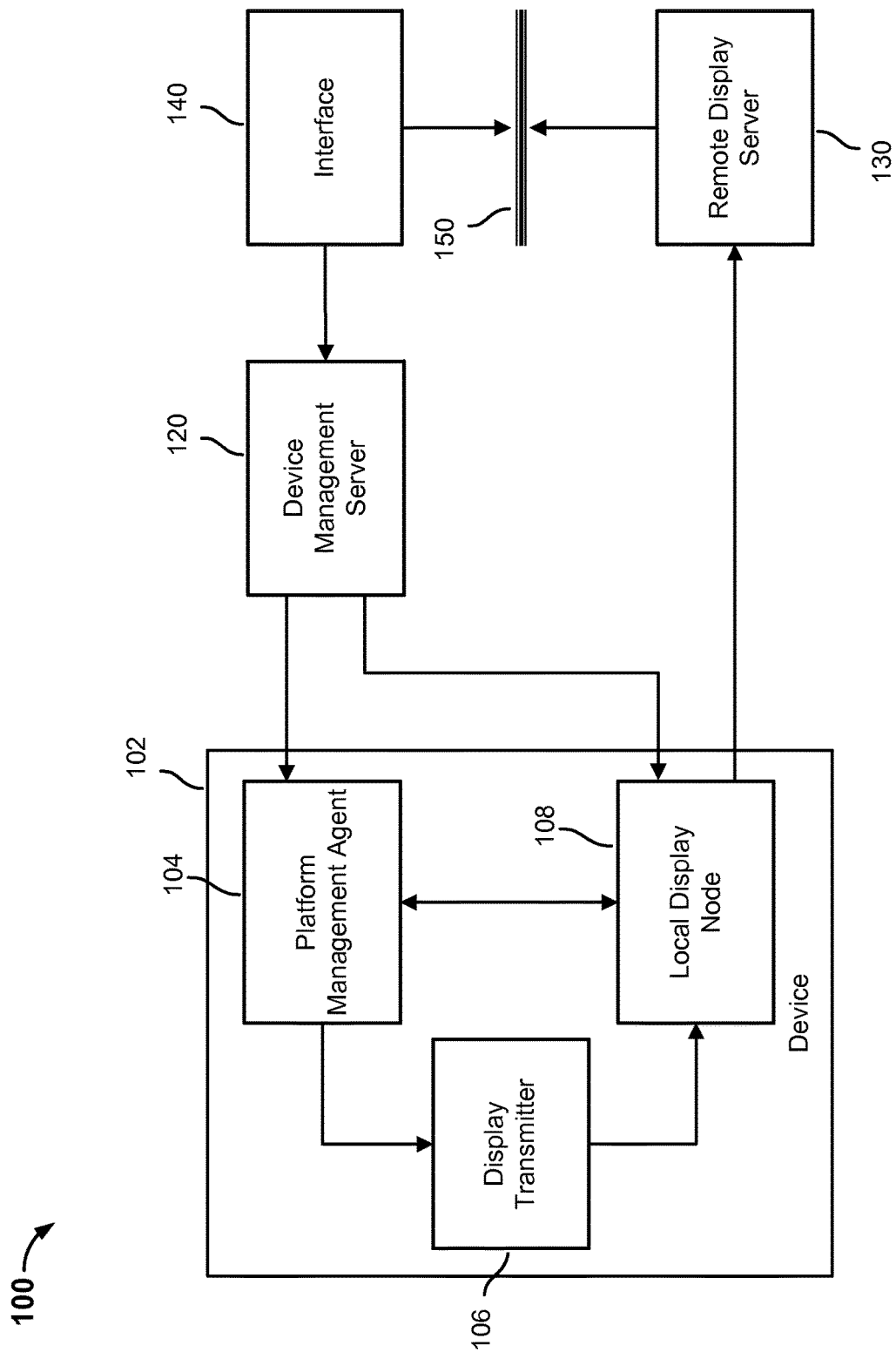
FIG. 1A is a block diagram illustrating embodiments of a system to transparently proxy streaming data from a mobile device to a remote display server.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Remote display using a proxy is disclosed. Disclosed herein are techniques to transmit a streaming data representation of a mobile device display to a remote display server, such as a remote display server that is not connected to a same local network as the mobile device. Certain mobile devices include wireless data streaming functionality, which allows a device to transmit a streaming data representation of its display to another device and/or server. This process is often referred to mirroring the device display. The remote display service features are often associated with the operating system of the mobile device. In certain devices including, for example, mobile devices running the iOS operating system, the remote display transmitter (e.g., an AirPlay system) of the operating system is only configured to establish streaming data connections with nodes in a network local to the device. Employing the techniques disclosed herein, a local display node (e.g., a remote display proxy application) is installed on a mobile device. The local display node is configured to establish a connection to the display transmitter and transparently proxy streaming device display data to a remote display server.

In various embodiments, information associated with a remote display server is received at a mobile device from a device management server. A local display node is advertised based at least in part on the received information. A request to connect to the local display node is received from a component of the mobile device, such as a display transmitter. The component sends the request at least in part in response to a command received from the device management server to connect to the local display node. The component is configured to connect to display nodes that are on a same local network as the mobile device. The local display node uses the information associated with the remote display server to advertise the local display node in a manner that associates the local display node with the command received by the component from the device management server. A connection is established between the local display node and the component at least in part in response to the request. The information associated with the remote display server and the connection established between the component and the local display node are used to transparently proxy data from the component to the remote display server.

FIG. 1A is a block diagram illustrating embodiments of a system to transparently proxy streaming data from a mobile device to a remote display server. In the example shown, a system 100 to transparently proxy streaming data includes a mobile device 102, a device management server 120, a remote display server 130, an interface 140, and/or other components. The techniques disclosed herein may be used to establish a streaming data connection between the device 102 and the remote display sever 130. In certain cases, a streaming video data including a rendering of the mobile device display is transmitted to a local display node 108 on the device and forwarded from the local display node 108 to a remote display server 130. The remote display server 130 may be connected to an interface 140 and the streaming data is provided to the interface 140 for display.

A mobile device 102 may include a mobile device, smartphone, tablet, personal computer, laptop computer, and/or other computing device. The mobile device 102 may include a platform management agent 104, a display transmitter 106, a local display node 108, and/or other components.

A platform management agent 104 may include a mobile device management (MDM) agent associated with the operating system of the mobile device 102. In certain cases, the platform management agent 104 is embedded in the OS of the device 102, such as the iOS operating system. The platform management agent 104 may manage various aspects of the mobile device 102 including the configuration/settings of applications on the device, the security of the device 102, and/or other device functions.

A display transmitter 106 may include a component of the operating system of the device 102. The display transmitter 106 may include, for example, a system AirPlay client, a media playing service client, a remote display service client, a display component, and/or other transmitter. The display transmitter 106 may be a component of the device operating system and/or may be embedded in the device operation system. The display transmitter may, for example, be a component of a media playing/streaming service that supports screen mirroring, such as Apple Airplay, Google Chromecast, etc. The display transmitter 106 may be configured to capture a screen/display of the device 102 and transmit a representation of the screen (e.g., a rendering of the screen) to a display node and/or display server. In certain cases, the display transmitter 106 captures the entire display of the device as opposed to, for example, a display associated with an application. The display transmitter 106 may, for example, mirror the screen of the mobile device to a display node and/or display server. In some cases, the display transmitter 106 may be configured to, for example, capture a video stream of the display of the device and continuously transmit the video stream to a display node, such as the local display node 108, display servers in a same local network as the device 102, and/or other nodes. In certain cases, the video stream of the device display is generated at a graphics component (e.g., a graphics card) of the device 102 as the actual screen display is generated. The display transmitter 106 may be connected to and/or associated with the graphics component of the device 102 and may receive the video stream of the device display from the graphics component.

In various embodiments, a display transmitter 106 is configured to connect to display nodes that are on a same local network as the mobile device. In certain cases, the display transmitter 106 is configured to only connect to display nodes that are on a same sub-net, local area network (LAN), and/or virtual local area network (VLAN) as the mobile device 108. In one example, a display transmitter 106 (such as an AirPlay client, a media streaming service client) implements the Bonjour protocol, the multicast Domain Name System (mDNS), domain name system-service discovery (DNS-SD), and/or other protocol to locate display nodes. The Bonjour protocol, mDNS protocol, and/or other similar protocols use IP multicast user datagram protocol (UDP) packets to discover display nodes. Because UDP packets may not traverse routers, the Bonjour protocol, mDNS protocol, and/or other similar protocols may only be used to locate display nodes on a network local to the display transmitter 106.

In some embodiments, a local display node 108 may include and/or be associated with a remote display proxy application installed on the device 102. The remote display proxy application may, for example, be provided to and/or installed on the device by a third party MDM provider. The third party MDM provider may be associated with the device management server 120. The remote display proxy application may be a managed application that is managed by, for example, the platform management agent 104.

A local display node 108 may include a reverse proxy. The local display node 108 may, for example, be configured to advertise itself as a display node and/or display server, establish a connection to the display transmitter 106, receive streaming data from the display transmitter 106, and/or transparently proxy the streaming data to the remote display server 130, a proxy server (not shown), and/or other nodes.

In various embodiments, the local display node 108 is configured to advertise itself as a local display node using, for example, the Bonjour, mDNS, DNS-SD, and/or other protocol. For example, the local display node 108 may be configured to advertise itself as a specific display, such as "Display1234." In certain cases, a command is sent to the display transmitter 106 instructing the display transmitter to connect to the advertised local display node 108. The device management server 120 may send a request display command to the display transmitter 106 via, for example, the platform management agent 104. The request display command may include as a parameter a name of a display node to which the display transmitter 106 is to connect. In certain cases, the name of the display node to which the display transmitter is to connect 106 matches (is the same as) a name by which the local display node 108 advertises itself. By way of example, a local display node 108 may be configured (e.g., by the device management server) to advertise itself as "Display1234." A request display command sent to the display transmitter 106 may include a parameter "name of display=Display1234." Based on the command, the display transmitter 106 may establish a connection to the display node identified in the request display command—the local display node 108 advertising itself as "Display1234."

In certain cases, the local display node 108 is configured by the device management server 120 to transmit streaming data to a specific remote display server 130. The device management server 120 may provide to the platform management agent 104 managed application configuration information including a name of remote display server 130, an IP address of the remote display server 130, a port number over which to transmit data to the remote display server 130, and/or other information associated with the remote display server 130. The platform management agent 104 may use the managed application configuration information to configure the local display node 108 to transmit data to the IP address and/or port number associated with the remote display server 130.

In some embodiments, the local display node 108 uses information associated with the remote display server 130 to establish a connection to the remote display server 130. As discussed above, information associated with remote display server 130 may include an IP address, port number, and/or other information. And this information is used to establish a connection to the remote display server 130. In one example, the local display node 108 uses information associated with the remote display server 130 to establish a transmission control protocol (TCP) connection between the local display node 108 and the remote display server 130.

In various embodiments, the local display node 108 may use the information associated with the remote display server (e.g., IP address, port number, etc.) and the connection established between the component and the local display node to transparently proxy data from the component to the remote display server. For example, the display transmitter 106 may provide streaming mobile device display data to the local display node 108, and the local display node 108 transmits the streaming data to the remote display server 130. In certain cases, the local display node 108 only receives and transmits streaming data and does not process the streaming data in any manner.

In some embodiments, the remote display server 130 receives the streaming data from the local display node 108. The remote display server 130 may output the streaming data to an interface 140. An interface 140 may include, for example, a display on a computer, a display within a web browser, a television, a mobile device, and/or any other interface.

In some embodiments, a process to stream data from the mobile device 102 to the interface 140 is initiated at the interface 140. In certain cases, a user initiates a remote display session via the interface 140. In one example, a help desk technician may initiate a remote display session to stream the display of an enterprise employee's mobile device 102 to a display associated with the interface 140. A user (e.g., help desk technician) may, for example, provide input identifying the mobile device 102 from which to receive streaming display data. The user may also provide input including information associated with a remote display server 130. In various embodiments, the remote display server 130 and the interface 140 may be connected to a local network 150. The remote display server 130 may announce its remote display capabilities to the local area network 150 using, for example, the DNS-SD protocol and/or another protocol. The interface 140 and/or a computing device associated therewith may look up the remote display server 130 announcement, and the remote display server 130 may be output in a list of available remote display servers. In one example, an interface 140 includes a web browser, and the web browser includes an extension configured to function as a remote display browser that discovers remote display servers and outputs a list of the discovered remote display servers in the interface 140. In certain cases, a user selects the remote display server 130 from a list of remote display servers. The interface 140 may provide to the device management server information associated with the remote display server 130. The information associated with the remote display server may include, for example, a name of the remote display server (e.g., DisplayABCD, HelpDesk-JaneSmith, etc.), an IP address of the remote display server 130, a port number on which to transmit data to the remote display server 130, and/or other information. Using the techniques described above, the device management server 120 uses the information identifying the mobile device 102, information associated with the remote display server 130, and/or other information to establish a streaming data connection between the device 102 and the remote display sever 130.

Figure 1B:
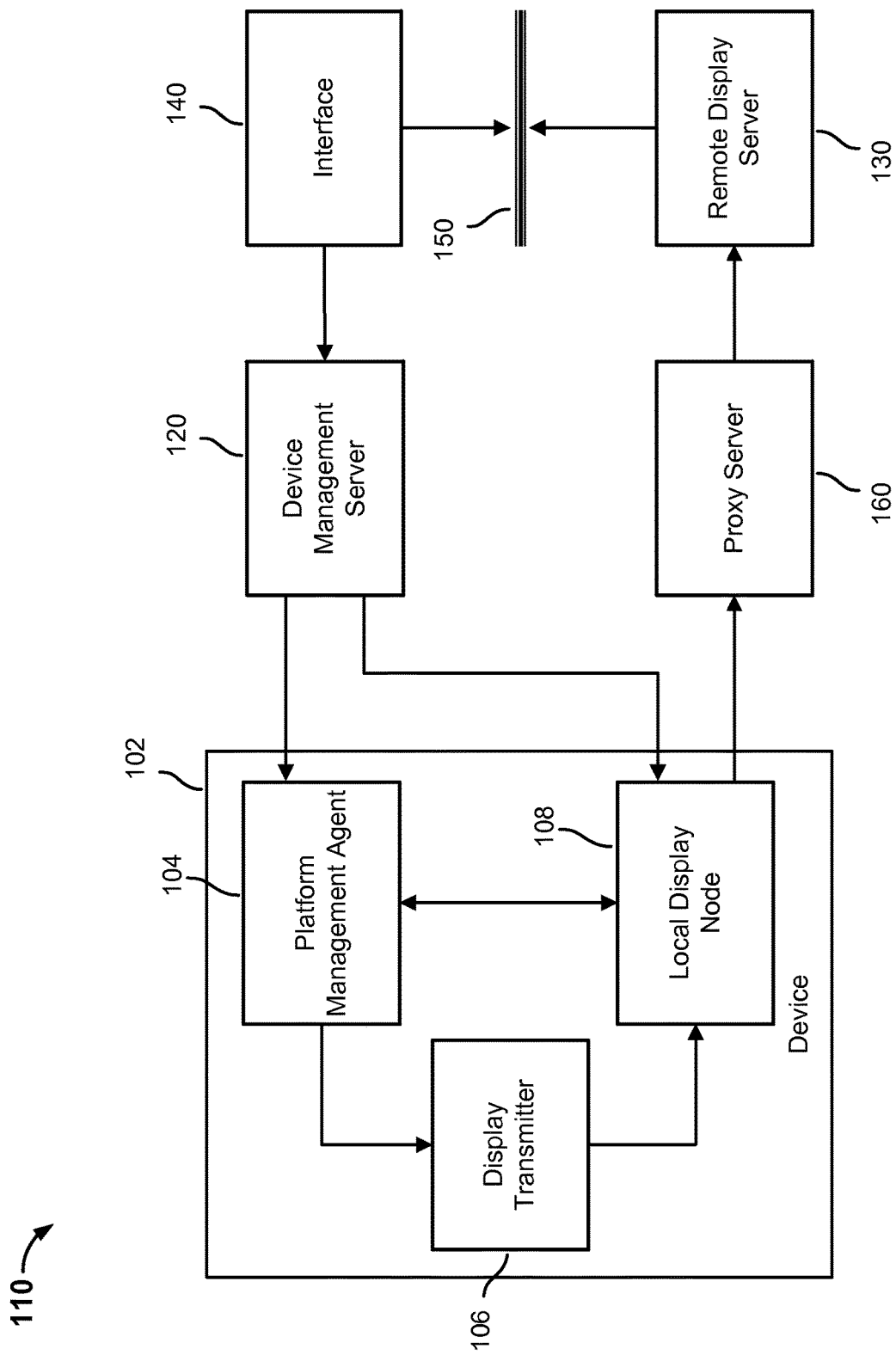
FIG. 1B is a block diagram illustrating embodiments of a system to transparently proxy streaming data from a mobile device to a remote display server.

FIG. 1B is a block diagram illustrating embodiments of a system to transparently proxy streaming data from a mobile device to a remote display server. In various embodiments, system 110 of FIG. 1B includes similar components to the system 100 of FIG. 1A. In the example shown, the local display node 108 is configured to transparently proxy data from the display transmitter 106 to a proxy server 160. The proxy server 160 may receive the data and provide the data to the remote display server 130. In some cases, a secure communications tunnel is established between the local display node 108 and the proxy server 160. For example, the local display node 108 and proxy server 160 may establish a secure sockets layer (SSL), transport layer security (TLS), and/or other secure connection. Streaming data from the display transmitter 106 is provided to the proxy server 160 over the secure tunnel. In certain cases, a virtual private network (VPN) connection is established between the local display node 108 (e.g., including a VPN client) and the proxy server 160 (e.g., including a VPN server). In some cases, the proxy server 160 may process the streaming data by, for example, decrypting the streaming data. The proxy server 160 may pass the streaming data to the remote display server 130, and the remote display server 130 provides the streaming data to the interface 140 for display.

Figure 2:
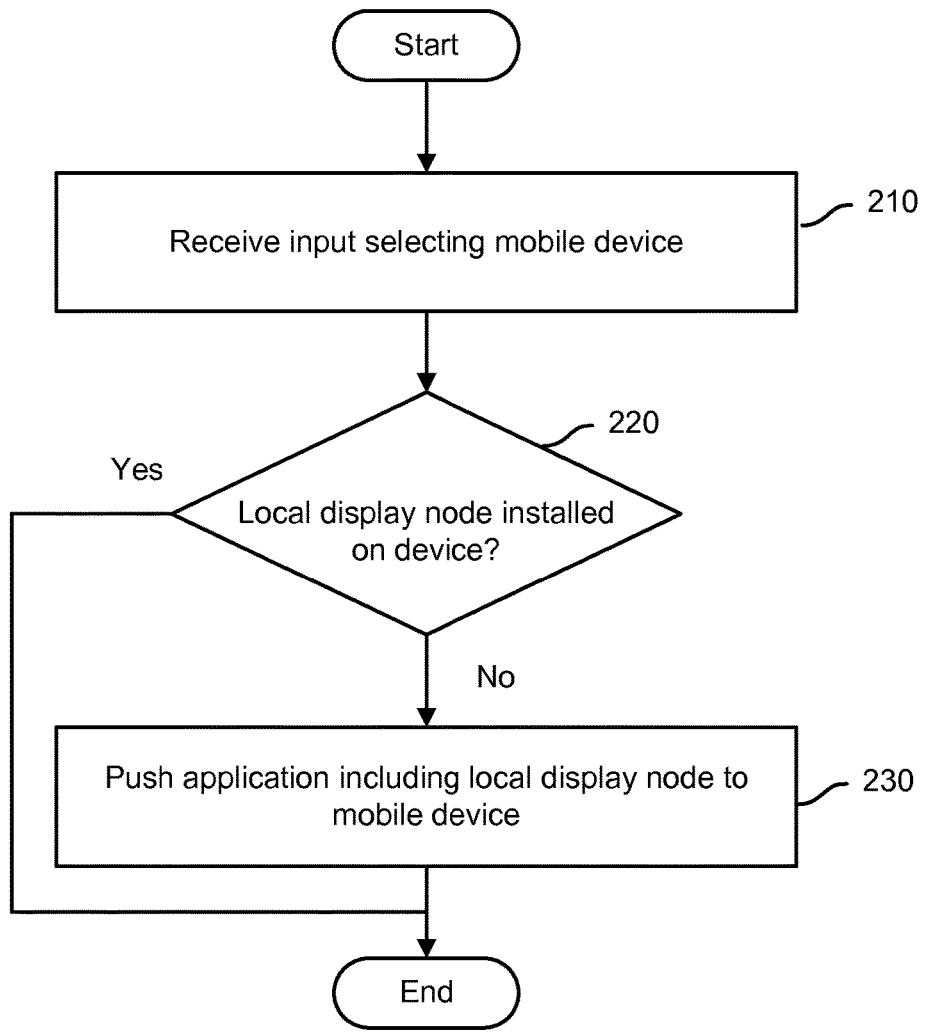
FIG. 2 is a flowchart illustrating embodiments of a process to configure a mobile device for remote display.

FIG. 2 is a flowchart illustrating embodiments of a process to configure a mobile device for remote display. In various embodiments, the process of FIG. 2 is performed to initiate a remote display session for a mobile device. In one example, a help desk technician may initiate a remote display session to view the display of an end user's mobile device (e.g., an employee's mobile device). An end user may, for example, contact a help desk. Or a help desk ticket may be opened and the help desk technician may follow up and contact the user. In certain cases, the end user may communicate with the help desk via telephone, email, and/or other out-of-band communications. In some cases, an end user may contact the help desk via an interface of a help desk application that is associated with and/or includes the local display node. The help desk technician may then initiate the process of FIG. 2.

In the example shown, input selecting a mobile device is received (210). For example, an interface associated with a device management server may provide a list of mobile devices. The list of mobile devices may include one or more mobile devices managed by an enterprise. Input selecting a mobile device may be received from a user. Continuing with the above example, a help desk technician may log into an interface associated with a device management server and select a device associated with an employee seeking assistance.

It is determined whether a local display node is installed (220) on the device. In various embodiments, a device management server may determine whether a local display node and/or application associated therewith is installed on the mobile device. In certain cases, a local display node may include and/or be a component of an application, such as a help desk application. A device management server may include a list of applications installed on the device. In the event a device application associated with the local display node is included in the list, it may be determined that the local display node is installed on the device and the process may end. In the event the local display node is not installed on the device, the process proceeds to step 230.

An application including the local display node is pushed (230) to the mobile device. In various embodiments, the device management server pushes an application including the local display node to the mobile device, and the application including local display node is installed on the mobile device.

Figure 3:
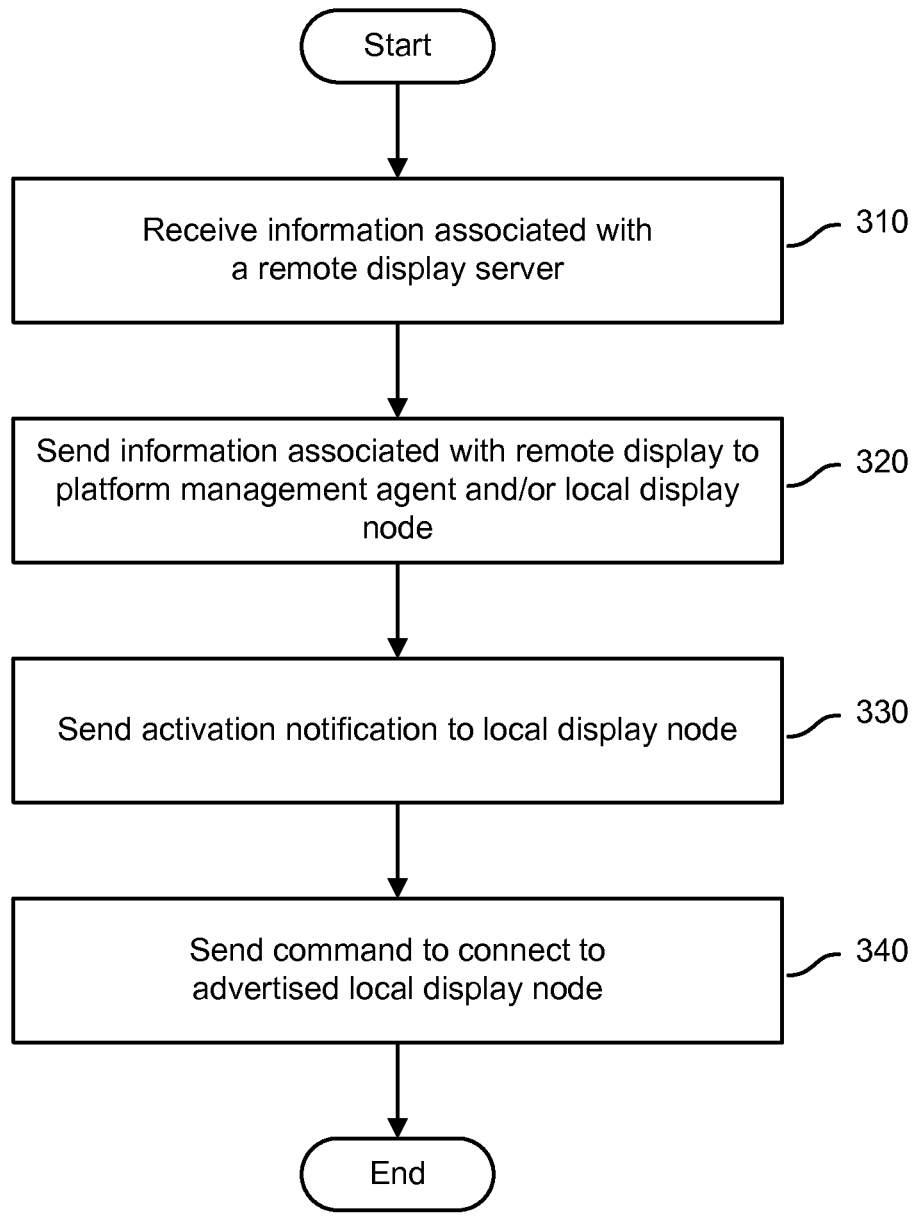
FIG. 3 is a flowchart illustrating embodiments of a process to send a mobile device commands to connect to local display node.

FIG. 3 is a flowchart illustrating embodiments of a process to send a mobile device commands to connect to local display node. In various embodiments, the process of FIG. 3 is performed at a device management server, such as device management server 120 of FIG. 1A. In the example shown, information associated with a remote display server is received (310). Information associated with remote display server may include, for example, a name of the remote display server, an IP address of the remote display server, a port number of the remote display server on which streaming data to be provided, and/or other information. In some embodiments, an interface (e.g., interface 140 of FIG. 1A) may be provided, and a user may enter information associated with the remote display server into the interface. In one example, a user enters a remote display server name, an IP address, port number, and/or other information associated with a remote display server into the interface. In certain cases, however, information associated with remote display server may not be known by and/or readily available to a user. In some embodiments, an interface may include a remote display service browser (e.g., an AirPlay browser), which displays the available remote display servers (e.g., AirPlay servers). The remote display service browser may, for example, display one or more remote display servers that are available on a local network. Remote display servers may, for example, announce remote display capabilities to a local network using, for example, the domain name system-service discovery (DNS-SD) protocol and/or another similar protocol. The remote display service browser may receive the capability announcements from one or more remote display servers and provide a list of available remote display servers. The user may select a remote display server, discover its IP address, port number, and/or other information associated with the remote display server. The user may then provide information associated with the remote display server to a device management server.

Figure 4:
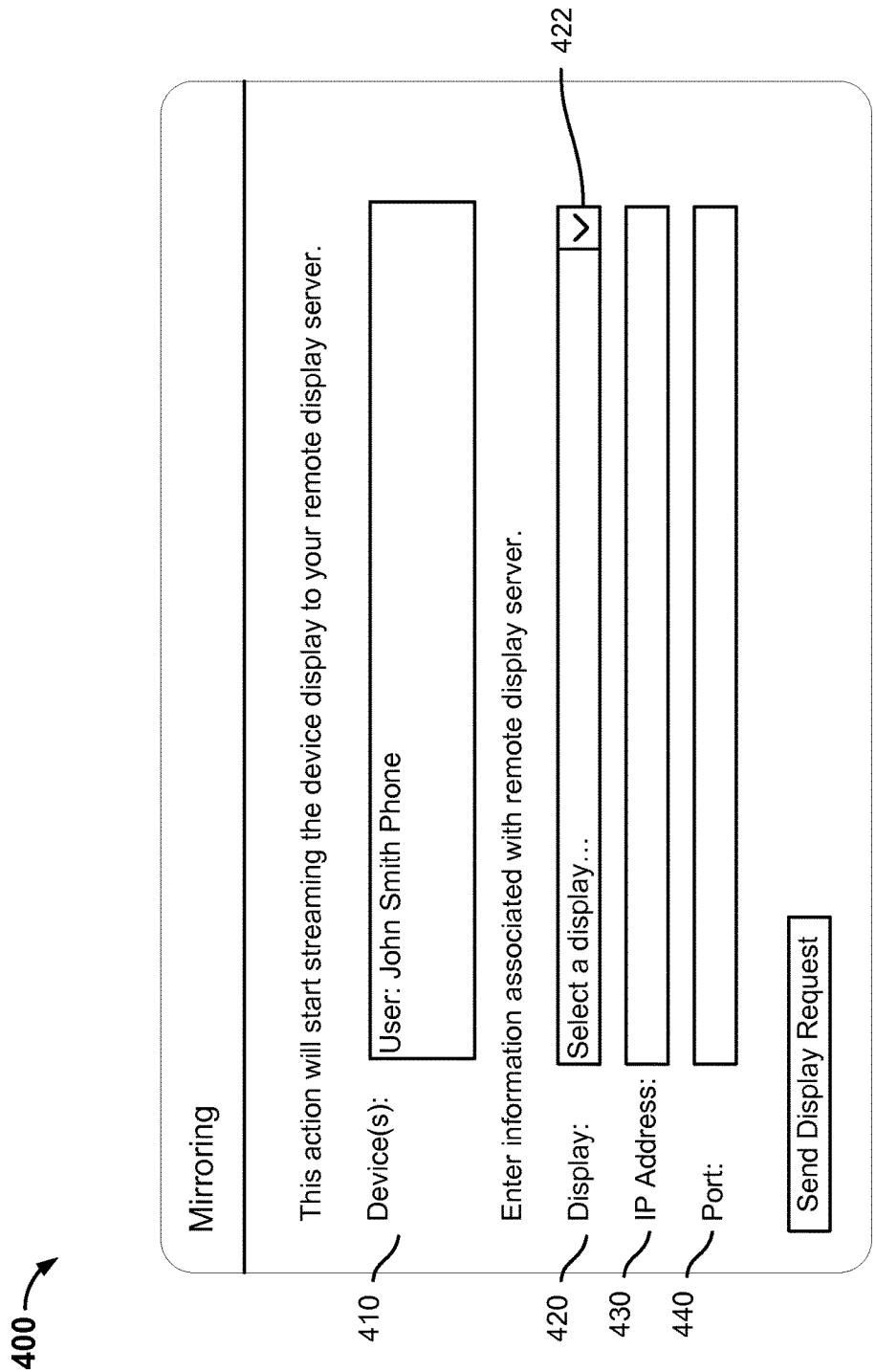
FIG. 4 is a diagram illustrating embodiments of an interface to input remote display server and device information.

In various embodiments, the device management server may include and/or be associated with a web application. In certain cases, the device management server may include and/or be interfaced with a web application, and web applications may not include network functionality necessary to find the remote display servers local to the browser. In this case, the remote display service browser may instead run inside the browser and, for example, not on the device management server. In some embodiments, a browser extension may include functionality to display available remote display servers. A web browser extension (e.g., a Firefox extension) may be used to run a remote display service browser (e.g., AirPlay browser) within a web browser. In this case, the extension may be installed into a web browser, and when a user visits a device management server using the browser, a plugin may be invoked to auto-populate the list of available remote displays in, for example, a mirroring dialog. A user may select a remote display server, and the browser extension may be configured to provide the device management server information associated with the selected remote display server, such as an IP address, port number, and/or other information associated with the remote display server. An example web browser including a browser extension to discover and populate a list of available remote display servers is depicted in FIG. 4 and described below.

Information associated with the remote display server is sent (320) to the platform management agent and/or local display node. In various embodiments, a device management server generates a management application configuration applicable to the local display node and/or managed application associated therewith. The managed application configuration includes information associated with the remote display server (such as an IP address, port, and/or other information associated with the remote display server), command(s) to stream data to the remote display server, and/or other information. The managed application configuration is provided to a platform management agent on the mobile device. And the platform management agent uses the managed application configuration to configure the local display node to transparently proxy streaming data to the remote display server at the IP address and/or port number included in the managed application configuration.

In various embodiments, information associated with the remote display server is sent directly to the local display node. In some cases, a push notification including the information associated with the remote display server may be sent to the local display node (e.g., remote service proxy application) on the mobile device. The local display node receives the information associated with the remote display server and is configured based on the information to transparently proxy streaming data to the remote display server. In certain cases, the information associated with remote display server is provided to the local display node in an activation notification message sent to the local display node.

An activation notification is sent (330) to the local display node. In various embodiments, the device management server sends a wake-up notification (e.g., activation notification) to the local display node. The activation notification may, for example, command the local display node to advertise itself as a local display node within a local network. The local display node may, for example, advertise itself as a local display node to applications and/or other nodes on a same device as the local display node. In one example, the local display node advertises itself as "Display1234," and as discussed below a display transmitter on the device may be instructed to connect to a display node advertising itself as "Display1234."

In various embodiments, step 330 may be optional. The local display node may, in certain cases, be activated using other techniques. In some cases, the local display node is activated upon receiving the information associated with the remote display server. For example, the platform management agent may update the configuration of the local display node using the managed application configuration received from the device management server. And the local display may be activated when the local display configuration is updated. In another example, the local display node may be activated by a user opening an application (e.g., remote display service proxy application) associated with the local display node. In this case, it may not be necessary to send an activation notification to the local display node.

A command to connect to an advertised local display node is sent (340). In various embodiments, a display request command is sent to a platform management agent on a device. The platform management agent may use the command to configure a display transmitter on the device to establish a connection to the local display node. A display request command may include a request to establish a connection with a particular display. In some cases, the display request command includes a request to establish a connection with the local display node. For example, the local display node may be configured to advertise itself as "Display1234," and the display request command may command the display transmitter to connect to a display advertising itself as "Display1234." The display transmitter establishes a connection with the local display node based at least in part on the display request command received from the device management server.

In some embodiments, various commands, messages, and/or other information described herein are sent to the mobile device, local display node, and/or other nodes using a push notification service (e.g., the Apple Push Notification Service (APNS)). For example, information associated with a remote display server, activation notification messages, and/or other information and/or commands may be sent to the local display node and/or an application associated therewith as push notification messages. The local display node and/or application associated therewith may include a managed application, which is managed by, for example, the platform management agent and/or a third-party management agent.

In various embodiments, a device management server may be modified to make push messaging (e.g., APNS messaging) for managed applications, such as the local display node, more widely available. In certain cases, an application store upload wizard (e.g., iOS App Store upload wizard) may be configured so that if a managed application has the flag "apns=true" in its property list file (e.g., plist file) the wizard may generate a prompt for a messaging certificate and private key password. In some embodiments, there may be a checkbox on the wizard that allows uploading of the certificate for any application (e.g., even a non-third party managed application). In various embodiments, other approaches may be implemented by the device management server to retrieve application instance's messaging token.

In some embodiments, other approaches may be used to provide messages to an application, such as the local display node. In one example, a "sendMessage" web service endpoint may accept an application bundle id and/or additional JavaScript Object Notation (JSON) payload to send to an application.

According to some embodiments, a private application programming interface (API) which third party managed applications use to upload the messaging token in a private report may be made public. Other techniques for uploading a messaging token to the device management server may be used.

FIG. 4 is a diagram illustrating embodiments of an interface to input remote display server and device information. In the example shown, an interface 400 is provided by a device management server. The interface 400 may be used to initiate a streaming data connection between a device and remote display server. The interface 400 includes a device input field 410 for a user to enter a device from which data is to be streamed. In the example shown, data is to be streamed from a device entitled "User: John Smith Phone." In certain cases, the device management server may provide a list of managed devices, and the device may be selected from the list of managed devices.

In some embodiments, the interface 400 includes a remote display server selection field 420. In various embodiments, a web browser extension may be associated with the interface 400. The web browser extension (e.g., a Firefox extension, Internet Explorer extension, etc.) may run a remote display service browser. The remote display service browser included in the extension may identify available remote display servers, for example, on a network local to the interface 400. The web browser extension may be invoked to discover a one or more remote display servers and auto-populate a list of available remote display servers 422 into the remote display server selection field 420. A user may select a remote display server from the list 422 (e.g., pull down menu) of remote display servers. Upon selecting a remote display server from the list 422, information associated with the selected remote display server, such as a name of the remote display server, an IP address of the remote display server, port number on which to stream data to the remote display server, and/or other information is provided to the device management server.

According to some embodiments, a web browser may not include the remote display service browser extension, and in this case the drop-down list may be disabled. The user may, in this case, enter the IP address and port manually.

In various embodiments, the interface includes an IP address input field 430. In various embodiments, a user may enter an IP address associated with a remote display server in the IP address input field 430. For example, a user may determine that an IP address associated with remote display server includes 127.6.5.4, and this IP address may be entered in the IP address input field 430.

In various embodiments, the interface includes a port number input field 440. In various embodiments, a user may enter a port number over which the remote display server is to receive streaming data in the port number input field 440. For example, a user may determine that a port number over which data is to be streamed to remote display server includes port number 47126, and this port number may be entered in the port number input field 440.

Figure 5:
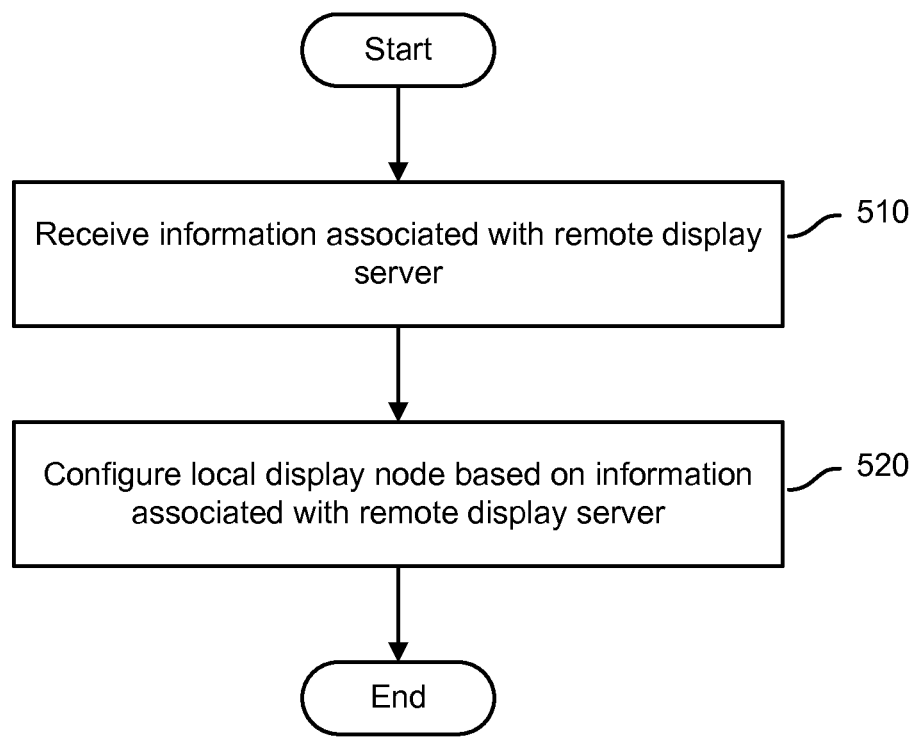
FIG. 5 is a flowchart illustrating embodiments of process to configure a local display node to provide data to a remote display server.

FIG. 5 is a flowchart illustrating embodiments of process to configure a local display node to provide data to a remote display server. In various embodiments, the process of FIG. 5 is implemented at a platform management agent, such as platform management agent 104 of FIG. 1A. In the example shown, information associated with a remote display server is received (510). In various embodiments, managed application configuration information is received from a device management server at a platform management agent. In some cases, the managed application configuration information includes configuration information for the local display node and/or an application associated with the local display node. The managed application configuration information may include, for example, information associated with a remote display server, such as an IP address, port number, and/or other information. In certain cases, the managed application configuration information includes an identifier and/or name by which the local display node is to advertise itself.

A local display node is configured (520) based on the information associated with the remote display server. In various embodiments, the platform management agent uses the managed application configuration information to configure the local display node and/or application associated therewith to provide data to a remote display server identified in the managed application configuration information. In one example, the managed application configuration information may include information associated with a remote display server, such as an IP address of 127.6.5.4, a port number of 47126, and/or other information. The information associated with the remote display server may have been entered by a user, such as an administrator, using the techniques disclosed herein (e.g., as disclosed with reference to FIGS. 3 and 4). The local display node may be configured to stream data to the IP address 127.6.5.4 using the port number 47126.

Figure 6:
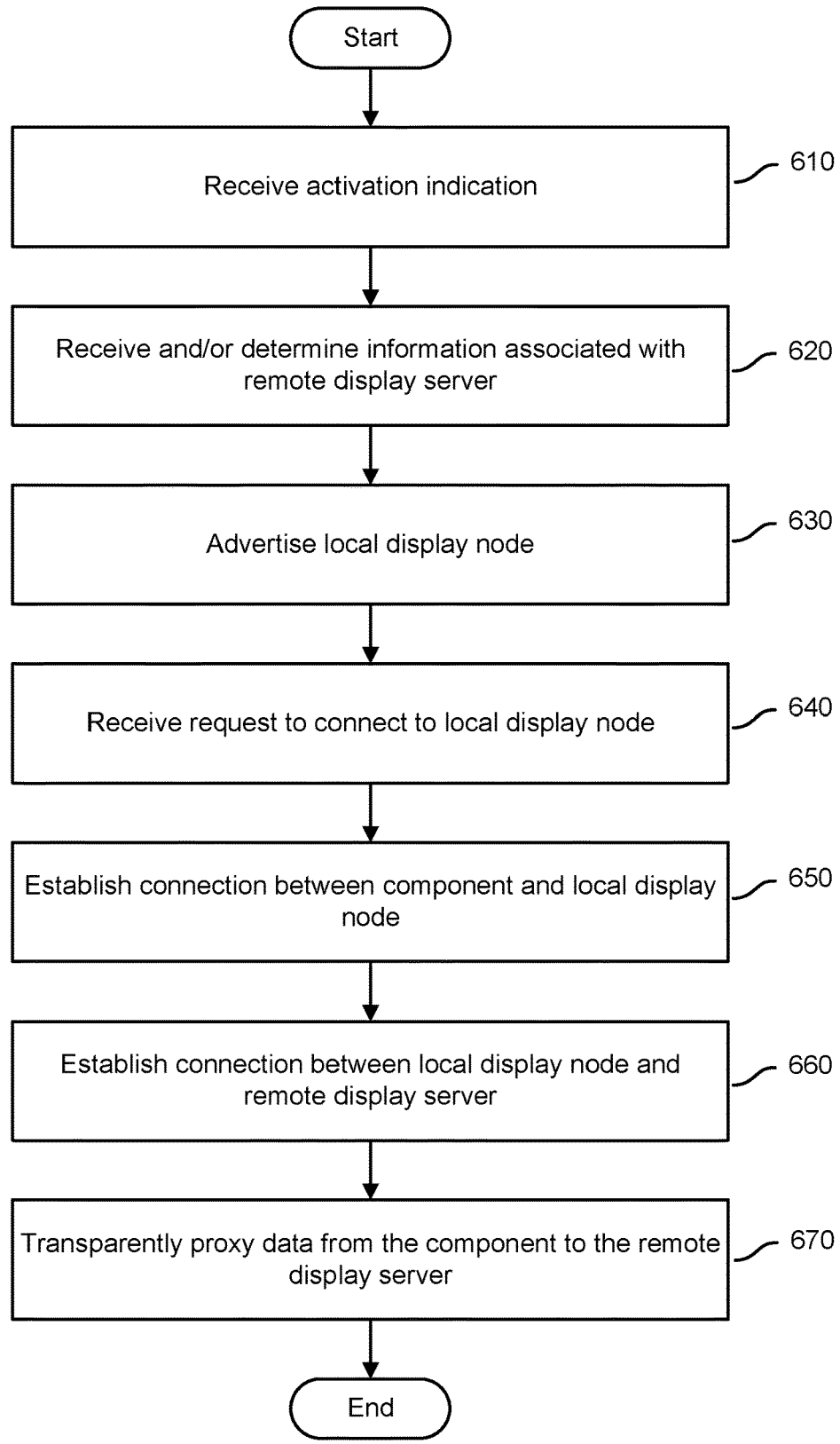
FIG. 6 is a flowchart illustrating embodiments of a process to transparently proxy streaming data from a mobile device to a remote display server.

FIG. 6 is a flowchart illustrating embodiments of a process to transparently proxy streaming data from a mobile device to a remote display server. In various embodiments, the process of FIG. 6 is implemented at a local display node, such as local display node 108 of FIG. 1A. In the example shown, an activation indication is received (610). In various embodiments, an activation indication includes a notification received at a local display node from, for example, a device management server. In certain cases, a device management server sends an activation and/or wake-up notification to a local display node. The activation notification may, for example, command the local display node to activate and advertise itself as a display node. In certain cases, the activation notification includes an identifier, such as "Device1234," that the local display node is to use to advertise itself. The identifier may be generated at the device management server. In some cases, the local display node includes a default identifier that the local display node uses to advertise itself, and in this case an identifier is not included in the activation notification.

In various embodiments, an activation indication is received when a user opens an application including the local display node. In certain cases, the local display node may be included in a remote display service proxy application, a help desk application, a collaboration application, and/or other application included on a mobile device. In one example, an activation indication is received when a user opens a help desk application to, for example, request help with an issue on the user's mobile device.

In some embodiments, a message including instructions to activate the local display node may be received at the mobile device. In certain cases, a short message service (SMS) message is sent to the mobile device. The SMS message may include, for example, a uniform resource locator (URL) to open an application associated with the local display node. For example, a help desk technician at the device management server may seek to establish a streaming data connection to a mobile device to, for example, help a device user troubleshoot an issue with the device. The help desk technician may enter information associated with the device at an interface associated with the device management server, and a text message is sent to the device. The text message may include a URL to activate an application associated with the local display node, and when the user clicks the URL an activation indication is received at the local display node.

Information associated with a remote display server is received and/or determined (620). In various embodiments, a local display node determines information associated with a remote display server from a managed application configuration applied to the local display node. As discussed above, the platform management agent uses managed application configuration information to configure the local display node to transparently proxy data from various nodes (e.g., a data transmitter on the device) to a specific remote display server. In one example, a local display node is activated, and upon activation the local display node retrieves information associated with a remote display server from the managed application configuration applied to the local display node. In certain cases, the local display node may interface with the platform management agent to determine the managed application configuration and/or information associated with a remote display server included in the managed application configuration.

The local display node is advertised (630). In various embodiments, the local display node advertises itself as a display node. The local display node may, for example, advertise itself as a display server (e.g., a remote display server) with the capability to receive streaming data and provide the streaming data to display, such as a computer display, television, and/or other display. In certain cases, however, the local display node is not associated with a display, and the local display node is configured to receive streaming data from a data transmitter and transparently proxy the streaming data to a remote display server. The local display node may, for example, advertise itself using, for example, the Bonjour, mDNS, DNS-SD, and/or other protocol(s). In various embodiments, the local display is advertised in a manner that associates the local display node with a command to connect to the local display node received by a component from the device management server. The local display server may advertise itself as a display associated with a certain name and/or identifier, such as "Display1234." In certain cases, the name by which the local display advertises itself may be the same as a name included in a command (e.g., a display request command) sent to a component of the mobile device. As discussed below, the command may include, for example, a command to connect to a display advertising itself using a certain name, and the name of the display in the command may be the same as the name advertised by the local display node. In some embodiments, the name by which the local display node advertises itself may be the same as a name associated with a remote display server to which the local display node is configured to transmit streaming data. For example, information associated with a remote display server may include a name of the remote display server, such as "DisplayABCD." And the local display node may be configured to advertise itself as "DisplayABCD."

A request to connect to the local display node is received (640). In various embodiments, a request to connect to the local display node is received from a display transmitter on the mobile device. In certain cases, the display transmitter sends a request to connect to the local display node based on a command received from the device management server via, for example, the platform management engine. In various embodiments, a display request command is sent from a device management server to a platform management agent. The display request may include a command directing a display transmitter associated with the operating system of a device to establish a connection to a particular display. In certain cases, the display request command includes a command to connect to a display, parameters identifying the display to which a connection to be established, and/or other information. By way of example, the local display node may be configured (e.g., by the device management server) to advertise itself as "Display1234." The device management server may send a display request command including parameters "Name of Display=Display1234." Based on the display request command, the platform management agent may invoke the display transmitter to connect to a display advertising itself as "Display1234"—the identifier by which the local display is advertising itself. Based on the request display command, the display transmitter sends a request to the local display node to establish a connection.

A connection is established (650) between a component of the mobile device and the local display node. In various embodiments, a connection is established between a display transmitter on a device and the local display node. As discussed above, a display transmitter may be commanded to establish a connection with a display advertising itself by a certain identifier. The display transmitter may receive an advertisement message from the local display node, and in response to the advertisement message sends a request to connect to the local display node. The local display node may respond to the request by establishing a connection to the display transmitter.

A connection is established (660) between a local display node and a remote display server. In various embodiments, the local display node uses the information associated with the remote display server to establish a connection to the remote display server. For example, the local display node may use an identifier associated with the remote display server, an IP address of the remote display server, a port number over which to send data to the remote display server, and/or other information to establish a connection to the remote display server. In certain cases, the connection between the local display node and the remote display server includes a Transmission Control Protocol (TCP) connection.

In various embodiments, the local display node may simultaneously establish inbound and outbound connections. For example, the local display node may receive a request from the display transmitter and establish an inbound connection between the local display node and the display transmitter. In parallel, the local display node may establish an outbound connection between the local display node and the remote display server. In certain cases, multiple inbound and outbound connections are established as the display transmitter streams data to the local display node and the local display node transmits the streaming data to the remote display server.

Data is transparently proxied (670) from a component of the mobile device to the remote display server. In various embodiments, information associated with the remote display server, the connection established between the component and the local display node, and/or the connection between the local display node and the remote display server are used to transparently proxy data from the component (e.g., display transmitter) to the remote display server. In various embodiments, a data transmitter is configured to capture a screen/display of the device and transmit/send a representation of the screen (e.g., a rendering of the screen) to the local display node on the established connection. The representation of the screen may include a video stream of the display of the device captured from, for example, a graphics card/engine on the device. The display transmitter may continuously transmit the video stream of the display to the local display node. The local display node may receive the video stream and continuously transmit the video stream to a remote display server. The local display node may, for example, continuously transmit the streaming video data to the remote display server over the established connection (e.g., TCP connection) between the local display node and the remote display server. In certain cases, the local display node receives streaming data from the display transmitter and transmits/forwards the streaming data to the remote display node without processing and/or modification.

Figure 7:
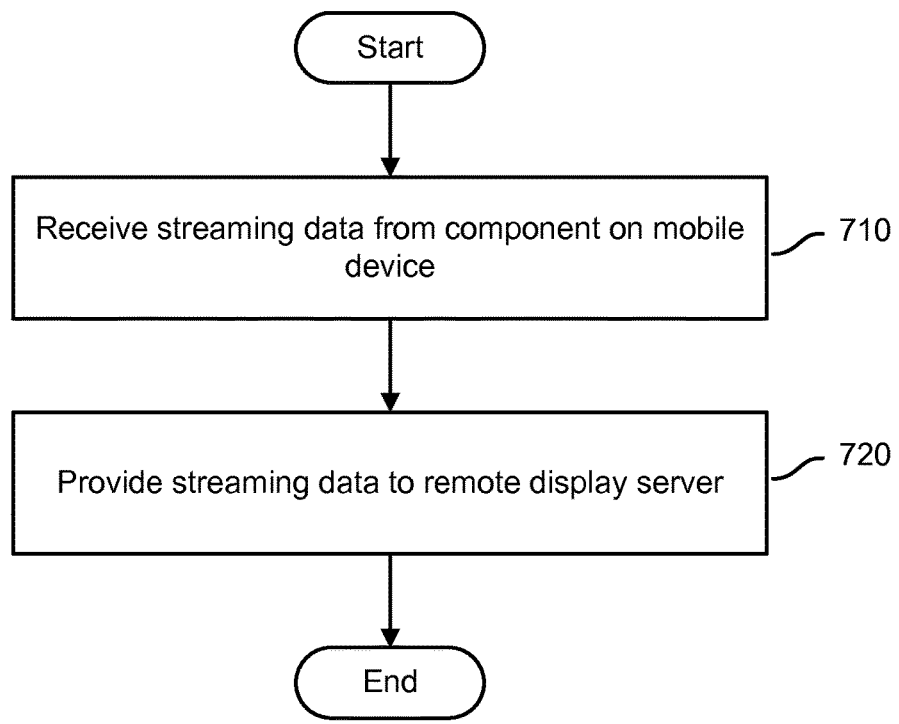
FIG. 7 is a flowchart illustrating embodiments of a process to provide streaming data to a remote display server.

FIG. 7 is a flowchart illustrating embodiments of a process to provide streaming data to a remote display server. In various embodiments, the process of FIG. 7 is performed at local display node, such as local display node 108 of FIG. 1A. In the example shown, streaming data is received (710) from a component on a mobile device. In various embodiments, a connection is established between the local display node and a display transmitter using the techniques disclosed herein. The data transmitter (e.g., an AirPlay system client) may be configured to capture a screen/display of the device and transmit a representation of the screen (e.g., a rendering of the screen) to the local display node on the established connection. In certain cases, the video stream of the device display is generated in a graphics component/card of the device as the actual screen display is generated, and the video stream from the graphics component is continuously provided to the display transmitter, for example, in real time and/or substantially in real time. The display transmitter transmits the streaming data to the local display node as it is received at the display transmitter.

Streaming data is transmitted (720) to the remote display server. In various embodiments, the streaming data received at the local display node is transmitted to a remote display server. In various embodiments, a connection is established between the local display node and a remote display server using the techniques disclosed herein. The local display node may receive streaming data from a display transmitter on the mobile device, and the streaming data is transmitted and/or forwarded to the remote display server over the established connection.

In some embodiments (not shown), streaming data is transmitted to a proxy server between the local display node and the remote display server. The streaming data may, for example, be transmitted to the proxy server over a secure connection between the proxy server and the local display node. For example, the local display node and proxy server may establish a secure sockets layer (SSL), transport layer security (TLS), and/or other secure connection. Streaming data from the display transmitter is provided to the proxy server over the secure tunnel. The proxy server may then provide the streaming data to a remote display server.

In various embodiments, the remote display server receives the streaming data and provides the streaming data to a display connected to the remote display server. In one example, an interface on a desktop, laptop, television, and/or other display connects to the remote display server over a local network associated with the remote display server. The streaming data is provided from the remote display server to the interface over the local area network. In one example, the interface is associated with a help desk technician that initiated the flow to establish the data streaming connection between the mobile device and the remote display server.

Figure 8:
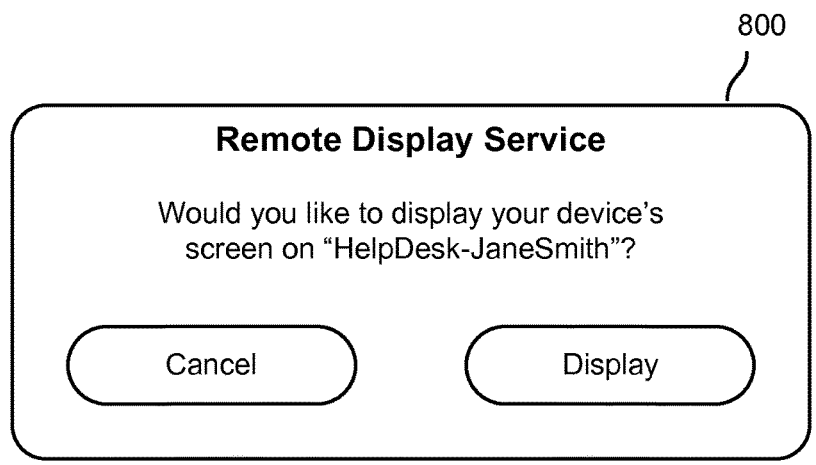
FIG. 8 is a diagram illustrating embodiments of a dialog requesting user permission to stream data from a mobile device to a remote display server.

FIG. 8 is a diagram illustrating embodiments of a dialog requesting user permission to stream data from a mobile device to a remote display server. In various embodiments, a dialog 800 is output to a user prior to streaming data from the mobile device to a remote display server. For example, prior to establishing a connection between the local display node and the remote display server, a dialog 800 is output to the user requesting the user's permission to the connect to the remote display server "HelpDesk-JaneSmith." In the event the user clicks "Display," a connection is established between the local display node and remote display server, and streaming data is received at the local display node and transmitted to the remote display server. In some embodiments, the dialog 800 is generated by the mobile device operating system. In certain cases, the mobile device management server may, for example, have control over the name of the display (e.g., "HelpDesk-JaneSmith"). In one example, the device management server may choose the name of the display based on the administrator's name, which may reduce conflicts on the network.

Figure 9:
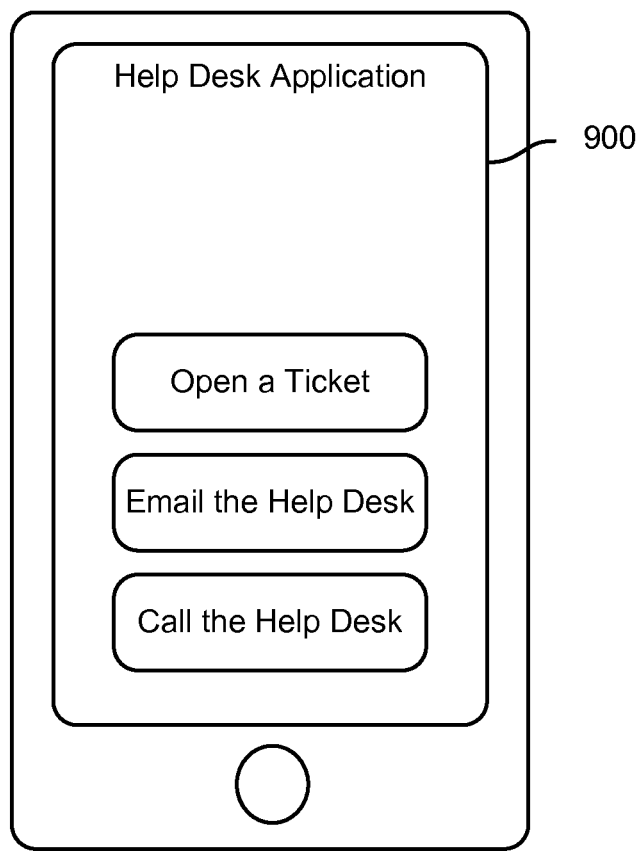
FIG. 9 is a diagram illustrating embodiments of help desk application interface.

FIG. 9 is a diagram illustrating embodiments of help desk application interface. In various embodiments, a help desk application display 900 includes links to open a help desk ticket, email the help desk, call the help desk and/or perform other operations. In certain cases, help desk application is associated with the local display node. The local display node may, for example, be a component of and/or feature within the help desk application.

In some embodiments, mobile device user may initiate a help desk session by using the help desk application interface 900. A help desk ticket may be generated by clicking a link in the application display 900 and/or by contacting a help desk administrator by email, telephone, or other out-of-band communication. Upon receipt of the ticket, a help desk technician may initiate the processes disclosed herein to mirror and/or otherwise stream data including the user's mobile device display to a remote display server connected to a display accessible to the helpdesk technician.

The techniques disclosed herein in various embodiments allow users located in separate locations to collaboratively view each other's mobile device displays. For example, the techniques disclosed herein may be used to establish a connection between a remote display server local to a first user and a second user's mobile device. Once the connection is established, streaming data including a display of the second user's device is transmitted from a display transmitter to a local display node, which transparently proxies the streaming data to the remote display server local to the first user. And the remote display server may be configured to provide the streaming data to a display local to the first user. A similar connection may be established between a remote display server local to the second user and the first user's device. Once connected, each user may be provided a display of the other user's device. The two users may collaborate while viewing each other's displays.

The techniques disclosed herein in various embodiments may be used in a training session environment. For example, a training session leader may initiate the processes disclosed herein to stream data including mobile device display to a remote display server. The remote display server may be associated with a display, such as a projector in a training facility, and the mobile device display may be projected on a screen associated with the projector. Various actions performed in the mobile device display may be output in real-time on the display in the training facility.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, at a mobile device, and from a device management server, a configuration applicable to a local display node provided by the mobile device, wherein the configuration comprises configuration information associated with connecting the mobile device with a remote display server, wherein the device management server is configured to receive, from a remote user associated with the remote display server, a request to stream data from the mobile device to the remote display server, wherein the request received by the device management server from the remote user includes: (1) an identification of the mobile device, and (2) an identification of the remote display server;
   activating the local display node;
   advertising, based at least in part on the received configuration information, an identifier associated with the local display node;
   receiving, from a display transmitter of the mobile device, a request to connect to the local display node that is on a same local network as the mobile device, wherein the display transmitter sends the request to connect to the local display node at least in part in response to receiving a command from the device management server instructing the mobile device to connect to the local display node;
   establishing a connection between the local display node and the display transmitter at least in part in response to the request to connect to the local display node; and
   transparently proxying, via the local display node, the data associated with the mobile device from the display transmitter to the remote display server using the connection established between the display transmitter and the local display node, wherein the remote display server is not connected to the same local network as the mobile device.

2. The method of claim 1, wherein the local display node comprises a remote display proxy application.

3. The method of claim 1, wherein the display transmitter is associated with an operating system of the mobile device.

4. The method of claim 1, wherein the configuration information includes one or more of a name of the remote display server, an internet protocol (IP) address of the remote display server, and a port number associated with the remote display server.

5. The method of claim 1, wherein activating the local display node includes generating an activation notification and wherein advertising the local display node is based at least in part on the activation notification.

6. The method of claim 1, wherein the configuration information includes a name of a remote display server, and wherein advertising the local display includes advertising the local display using the name of the remote display server.

7. The method of claim 6, wherein the command received from the device management server includes a command to connect to a display associated with the name of the remote display server.

8. The method of claim 1, wherein the configuration information is included in a mobile device management (MDM) application configuration received at a platform management agent on the mobile device.

9. The method of claim 8, wherein the platform management agent is configured to use the use the MDM application configuration to configure the local display node to transparently proxy the data associated with the mobile device to the remote display server.

10. The method of claim 1, further comprising using the configuration information to establish a connection between the local display node and the remote display server.

11. The method of claim 10, wherein the connection between the local display node and the remote display server includes a Transmission Control Protocol (TCP) connection.

12. The method of claim 1, further comprising using the configuration information to establish a connection with a proxy server, wherein the proxy server is configured to provide data from local display node to the remote display server.

13. The method of claim 1, wherein the proxying comprises:
   receiving, at the local display node, streaming data from the display transmitter; and
   providing the streaming data to the remote display server.

14. The method of claim 1, wherein the device management server is configured to perform the steps of:
   receiving input selecting the mobile device;
   determining that the local display node is not installed on the mobile device; and pushing the local display node to the mobile device for installation.

15. The method of claim 1, wherein an interface associated with the device management server is configured to:
discover one or more remote display servers and information associated with each of the one or more remote display servers;
output a list including the remote display servers;
receive selection of the remote display server; and
provide the information associated with the remote display server to the device management server.

16. A system, comprising:
a processor; and
a memory coupled with the processor, wherein the memory is configured to provide the processor with instructions which when executed cause the processor to:
receive, at a mobile device, and from a device management server, a configuration applicable to a local display node provided by the mobile device, wherein the configuration comprises configuration information associated with connecting the mobile device with a remote display server, wherein the device management server is configured to receive, from a remote user associated with the remote display server, a request to stream data from the mobile device to the remote display server, wherein the request received by the device management server from the remote user includes: (1) an identification of the mobile device, and (2) an identification of the remote display server;
activate the local display node;
advertise, based at least in part on the received configuration information, an identifier associated with the local display node;
receive, from a display transmitter of the mobile device, a request to connect to the local display node that is on a same local network as the mobile device, wherein the display transmitter sends the request to connect to the local display node at least in part in response to receiving a command from the device management server instructing the mobile device to connect to the local display node;
establish a connection between the local display node and the display transmitter at least in part in response to the request to connect to the local display node; and
transparently proxy, via the local display node, the data associated with the mobile device from the display transmitter to the remote display server using the configuration information and the connection established between the display transmitter and the local display node, wherein the remote display server is not connected to the same local network as the mobile device.

17. A computer program product, the computer program product being embodied in a non-transitory computer readable storage medium and comprising computer instructions for:
receiving, at a mobile device, and from a device management server, a configuration applicable to a local display node provided by the mobile device, wherein the configuration comprises configuration information associated with connecting the mobile device with a remote display server, wherein the device management server is configured to receive, from a remote user associated with the remote display server, a request to stream data from the mobile device to the remote display server, wherein the request received by the device management server from the remote user includes: (1) an identification of the mobile device, and (2) an identification of the remote display server;
activating the local display node;
advertising, based at least in part on the received configuration information, an identifier associated with the local display node;
receiving, from a display transmitter of the mobile device, a request to connect to the local display node that is on a same local network as the mobile device, wherein the display transmitter sends the request to connect to the local display node at least in part in response to receiving a command from the device management server instructing the mobile device to connect to the local display node;
establishing a connection between the local display node and the display transmitter at least in part in response to the request to connect to the local display node; and
transparently proxying, via the local display node, the data associated with the mobile device from the display transmitter to the remote display server using the configuration information and the connection established between the display transmitter and the local display node, wherein the remote display server is not connected to the same local network as the mobile device.

18. The method of claim 1, wherein the display transmitter is configured to only connect to display nodes that are on the same local network as the mobile device.

* * * * *

UNITED STATES PATENT AND TRADEMARK OFFICE
CERTIFICATE OF CORRECTION

PATENT NO. : 10,277,698 B1  
APPLICATION NO. : 14/569525  
DATED : April 30, 2019  
INVENTOR(S) : Gregory Christopher Gerard and Joshua Sirota Page 1 of 1

It is certified that error appears in the above-identified patent and that said Letters Patent is hereby corrected as shown below:

In the Claims

In Column 16, Claim 9, Line 43, after "configured to", delete "use the use the" and insert --use the--, therefor.

Signed and Sealed this  
Tenth Day of December, 2019

Andrei Iancu  
*Director of the United States Patent and Trademark Office*